United States Patent
Bedingfield et al.

(10) Patent No.: US 6,608,888 B2
(45) Date of Patent: Aug. 19, 2003

(54) METHODS AND SYSTEMS TO PROVIDE A MESSAGE IN A MESSAGING SYSTEM WITHOUT REVEALING AN IDENTITY OF THE SENDING PARTY

(75) Inventors: James Carlton Bedingfield, Lilburn, GA (US); Navneet Patel, Marietta, GA (US); Emily A. Candell, Waltham, MA (US); Ann V. McLaughlin, Sudbury, MA (US); Robert E. Braudes, Danvers, MA (US); Janice C. Chung, Lexington, MA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/964,203

(22) Filed: Sep. 25, 2001

(65) Prior Publication Data

US 2002/0110227 A1 Aug. 15, 2002

Related U.S. Application Data

(63) Continuation of application No. 09/450,603, filed on Nov. 30, 1999, now abandoned.
(60) Provisional application No. 60/121,922, filed on Feb. 26, 1999.

(51) Int. Cl.$^7$ .................................................. H04M 1/64
(52) U.S. Cl. ................................ 379/88.22; 379/201.11
(58) Field of Search ........................... 379/67.1, 88.12, 379/88.13, 88.17, 88.18, 88.19, 88.21, 88.22, 221.08, 201.01, 201.11, 210.03; 705/74, 80; 709/217, 219, 227, 228

(56) References Cited

U.S. PATENT DOCUMENTS 4,930,152 A  5/1990  Miller
4,933,967 A  6/1990  Lo et al.
5,058,152 A  10/1991  Solomon et al.

(List continued on next page.)

FOREIGN PATENT DOCUMENTS

EP  0255325  2/1988
EP  0412799  2/1991
EP  0507125  10/1992

(List continued on next page.)

OTHER PUBLICATIONS

"Voice Services on the Intelligent Network: Intelligent Peripherals and Service Nodes", F. Bosco, XP–000607359, Aug. 1992.
"The Belcore and ITU–T Call Model Operations", XP–002141946, 1998.
"Transactions in Intelligent Networks", XP–002141947, 1998.

(List continued on next page.)

*Primary Examiner*—Scott L. Weaver
(74) *Attorney, Agent, or Firm*—Nora M. Tocups

(57) ABSTRACT

Methods and systems to send a message from a sending party to a recipient without the message revealing an identity of the sending party. The identity may be the name of the sending party, a calling line number associated with a calling line of the sending party, or an e-mail address of the sending party. The message may be a reply to a previous message or a forwarding message of an earlier message. In response to a message being received, a check is made to determine whether an anonymity feature is enabled for all messages received from the sending party, or whether the anonymity feature is enabled for the message. In response to finding the anonymity feature enabled for all messages or for the message, an anonymity indicator is included with the message. The presence of the anonymity indicator has the effect of withholding the identity of the sending party when the message is made available to or retrieved by the recipient. Despite the withholding of the identity of the sending party, the recipient may reply to the message. An embodiment provides that a message including an anonymity indicator may be rejected instead of routed to the recipient.

28 Claims, 2 Drawing Sheets

U.S. PATENT DOCUMENTS

| | | | |
|---|---|---|---|
| 5,353,331 A | | 10/1994 | Emery et al. |
| 5,361,295 A | | 11/1994 | Solomon et al. |
| 5,425,091 A | | 6/1995 | Josephs |
| 5,493,607 A | | 2/1996 | Arumainayagam et al. |
| 5,521,969 A | * | 5/1996 | Paulus et al. .......... 395/200.03 |
| 5,572,583 A | | 11/1996 | Wheeler, Jr. et al. |
| 5,680,442 A | | 10/1997 | Bartholomew et al. |
| 5,684,862 A | | 11/1997 | Finnigan |
| 5,692,033 A | | 11/1997 | Farris |
| 5,712,903 A | | 1/1998 | Bartholomew et al. |
| 5,717,742 A | | 2/1998 | Hyde-Thomson |
| 5,740,230 A | | 4/1998 | Vaudreuil |
| 5,740,231 A | | 4/1998 | Cohn et al. |
| 5,742,763 A | * | 4/1998 | Jones .................... 379/142.01 |
| 5,742,769 A | | 4/1998 | Lee et al. |
| 5,742,905 A | | 4/1998 | Pepe et al. |
| 5,764,747 A | | 6/1998 | Yue et al. |
| 5,768,348 A | | 6/1998 | Solomon et al. |
| 5,790,637 A | | 8/1998 | Johnson et al. |
| 5,812,639 A | | 9/1998 | Bartholomew et al. |
| 5,812,670 A | * | 9/1998 | Micali .......... 380/25 |
| 5,832,072 A | * | 11/1998 | Rozenblit ............ 379/246 |
| 5,832,221 A | * | 11/1998 | Jones .................... 379/200.36 |
| 5,838,768 A | | 11/1998 | Sumar et al. |
| 5,848,132 A | | 12/1998 | Morley et al. |
| 5,884,270 A | * | 3/1999 | Walker et al. ............. 705/1 |
| 5,905,774 A | | 5/1999 | Tatchell et al. |
| 5,907,677 A | * | 5/1999 | Glenn et al. .............. 709/206 |
| 5,930,479 A | * | 7/1999 | Hall ................ 395/200.68 |
| 5,940,478 A | | 8/1999 | Vaudreuil et al. |
| 6,005,845 A | | 12/1999 | Svennesson et al. |
| 6,064,723 A | | 5/2000 | Cohn et al. |
| 6,148,069 A | | 11/2000 | Ekstrom et al. |
| 6,169,795 B1 | | 1/2001 | Dunn et al. |
| 6,209,100 B1 | * | 3/2001 | Robertson et al. .......... 713/200 |
| 6,226,359 B1 | * | 5/2001 | Montgomery et al. ..... 379/67.1 |
| 6,233,318 B1 | | 5/2001 | Picard et al. |
| 6,243,374 B1 | | 6/2001 | White et al. |
| 6,285,984 B1 | * | 9/2001 | Speicher .................... 705/14 |
| 6,301,349 B1 | | 10/2001 | Malik |
| 6,317,484 B1 | | 11/2001 | McAllister |
| 6,330,079 B1 | | 12/2001 | Dugan et al. |
| 6,339,640 B1 | | 1/2002 | Chen et al. |
| 6,353,661 B1 | * | 3/2002 | Bailey, III .............. 379/93.25 |
| 6,389,533 B1 | * | 5/2002 | Davis et al. ................ 713/162 |

FOREIGN PATENT DOCUMENTS

| | | |
|---|---|---|
| EP | 0543235 | 5/1993 |
| EP | 0624967 | 11/1994 |
| EP | 0662762 | 7/1995 |
| EP | 0 782 304 A2 | 12/1996 |
| EP | 0782304 A2 | 7/1997 |
| EP | 0782315 A2 | 7/1997 |
| EP | 0782316 A2 | 7/1997 |
| EP | 0 782 316 A2 | 7/1997 |
| EP | 0 813 162 A2 | 12/1997 |
| EP | 0813162 A2 | 12/1997 |
| EP | 0 825 752 A2 | 2/1998 |
| EP | 0825752 A2 | 2/1998 |
| EP | 0841796 A2 | 5/1998 |
| EP | 0843453 A2 | 5/1998 |
| EP | 0886228 A2 | 12/1998 |
| EP | 0 886 228 A2 | 12/1998 |
| EP | 0841796 A3 | 8/1999 |
| GB | 0899918 * | 3/1999 |
| WO | WO 97/08901 | 3/199 |

OTHER PUBLICATIONS

"General Recommendations on Telephone Switching and Signalling –Introduction to Intelligent Network Capability Set 1", International Telecommunication Union, XP–002141945, Mar. 1993.

"An Enhanced Message Networking Topology: Multimedia Messaging with the Intuity™ Interchange Server," Bell Labs Technical Journal, Apr. –Jun. 1998, pp. 124–135.

* cited by examiner 7

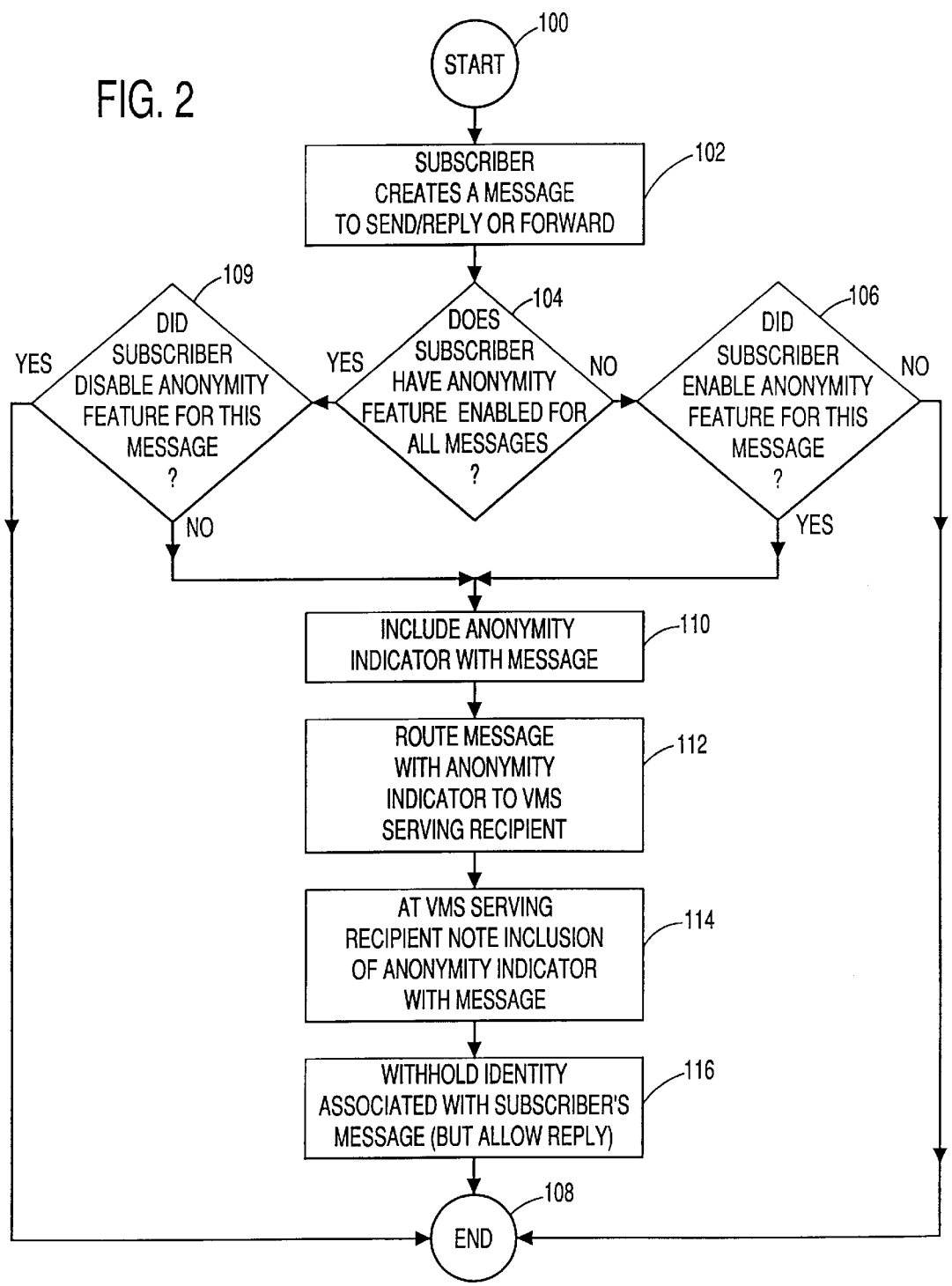

METHODS AND SYSTEMS TO PROVIDE A MESSAGE IN A MESSAGING SYSTEM WITHOUT REVEALING AN IDENTITY OF THE SENDING PARTY

RELATED APPLICATION

This is a continuation application of Ser. No. 09/450,603 filed Nov. 30, 1999 and now abandoned.

This application claims priority to and the benefit of one prior filed and commonly owned provisional application, referenced as: (1) "Anonymity in VMS—Methods and Systems to Provide a Message in a Messaging System Without Revealing an Identity of the Sending Party," filed in the United States Patent and Trademark Office on Feb. 26, 1999, assigned Application No. 60/121,922; and of one prior filed and commonly owned non-provisional application, referenced as: (2) "Methods and Systems to Provide a Message in a Messaging System Without Revealing an Identity of the Sending Party" Ser No. 09/450,603, filed Nov. 30, 1999, abandoned. The referenced provisional application and non-provisional application are incorporated herein by reference.

TECHNICAL FIELD

The present inventions relate to communications systems, and particularly, relate to messaging systems that allow a recipient to retrieve a message from a messaging system.

BACKGROUND

The public switched telephone network (PSTN) includes a feature whereby a caller may shield his/her identity from the person he/she is calling. The caller may implement a privacy restriction feature. With this shield in place, calling line identification services (often referred to as CallerID) generally cannot display identity information such as a calling name or a calling number in association with a call as it is received. For example, a doctor may use such a shield when making a call to a patient. If the patient's telephone service includes a calling line identification service, the shield prevents the service from being provided with the appropriate identity information from the network element serving the patient's calling line. Thus, the calling line identification service is defeated, and at best, it may display a "privacy restriction" or other notice with respect to the identity of the party making the call.

Unfortunately, the shield loses its protective abilities when a sender sends a message on a voice mail service (VMS) such as a network voice mail service and the message is transferred from voice mail platform to one or more other voice mail platforms. Typically, a network voice mail service that is implemented on messaging platforms that allow messages to be exchanged in an intra/inter-platform environment do not provide any facility or feature for a caller's anonymity when such messages are transferred between platforms. For example, assume a patient subscribes to a network voice mail service. Further assume a doctor sends a message to the patient which arrives in the patient's mailbox on the network voice mail service, and then the message is transferred to another (2d) platform. Generally, anybody retrieving the patient's messages from the second platform may activate an identify feature whereby the calling name and/or calling number associated with the doctor's message may be obtained.

Services other than network voice mail services also sometimes fail to include a facility or feature that protects a sender's anonymity. So-called "corporate voice mail systems" such as may be used in businesses, educational, medical, or other institutions may also fail to include a facility or feature that protects a sender's anonymity with respect to in-system messages.

The lack of a facility or feature for a sender's anonymity in certain cases in message systems has led to convoluted solutions. For example, some doctors and others desiring to maintain anonymity with respect to their messages may send a message to an answering service, and then have the answering service send the message to the patient or other recipient. If the answering service sends a message for the patient or other recipient on a network voice mail service and the message is transferred to another platform, anybody retrieving the message may activate an identify feature, but only receive the identity of the answering service in response. The convoluted nature of such solutions has demonstrated a need for a messaging system that protects the anonymity of a sender even when a message is transferred from platform to one or more platforms.

SUMMARY

The present invention solves the need for a messaging system that protects the anonymity of a sending party, should such anonymity be desired, by providing methods and systems that allow a message in a messaging system to be designated such that the message may be made available without revealing an identity of the sending party associated with the message.

Generally stated, exemplary embodiments of the present invention allow a determination to be made that the sending party associated with a message desires the message to be delivered without the identity of the sending party being revealed. In response to the determination, an anonymity indicator is included in the message. In response to the inclusion of the anonymity indicator, the identity of the sending party is withheld so that the message is made available to the recipient without making the identity of the sending party available.

More particularly stated, the present invention relates to exemplary methods and systems that provide for a message to be sent from a sending party to a recipient without the message revealing an identity of the sending party. The identity may be the name of the sending party, a calling line number associated with a calling line of the sending party, an e-mail address of the sending party, or the like. The message may be a message from the sending party to the recipient, a reply to a previous message, a forwarding message of an earlier message, or the like.

In response to a message being received from a sending party, a check is made to determine whether an anonymity feature is enabled for all messages received from the sending party, or whether the anonymity feature is enabled only for the received message. In response to finding the anonymity feature is enabled for all messages or only for the received message, an anonymity indicator is included with the message. The presence of the anonymity indicator has the effect of withholding the identity of the sending party when the message is made available to or retrieved by the recipient. A particular advantage of some of the exemplary embodiments of the present invention is that a recipient may reply to a message that has been provided to the recipient even though the identity of the sending party has not been provided to the recipient. The withholding of the identity of the sending party from inclusion with the message to the recipient does not effect the ability of the recipient to reply to the message, and therefore, to the sending party.

Another advantage of some of the exemplary embodiments of the present invention is that a recipient may reject or block a message that has been made available to the recipient without the identity of the sending party. For example, an exemplary embodiment provides that a message including an anonymity indicator may be rejected instead of being routed to the recipient.

Accordingly, it is an object of the present invention to provide methods and systems that protect the anonymity of a sending party in sending a message to a recipient by withholding the identity of the sending party when the message is made available to or retrieved by the recipient.

It is another object of the present invention to provide methods and systems that allow a sending party to enable an anonymity feature with respect to all messages that the sending party sends so that the identity of the sending party is withheld when the messages are made available to or retrieved by the respective recipients.

It is also an object of the present invention to provide methods and systems that allow a sending party to enable an anonymity feature with respect to a selected message so that the identity of the sending party is withheld when the message is made available to or retrieved by the recipient.

It is yet another object of the present invention to provide methods and systems that allow a recipient of a message from a sending party to reply to the message even though the message has been available or retrieved without the identity of the sending party.

It is a further object of the present invention to provide methods and systems that allow a recipient of a message from a sending party to reject the message if the message has been made available without the identity of the sending party.

That the present invention and the exemplary embodiments overcome the drawbacks set forth above and accomplish the objects of the invention will become apparent from the drawings and the detailed description below.

BRIEF DESCRIPTION OF THE DRAWINGS

FIG. 2 is a flow diagram illustrating an exemplary method of the present invention.

DETAILED DESCRIPTION

Figure 1:
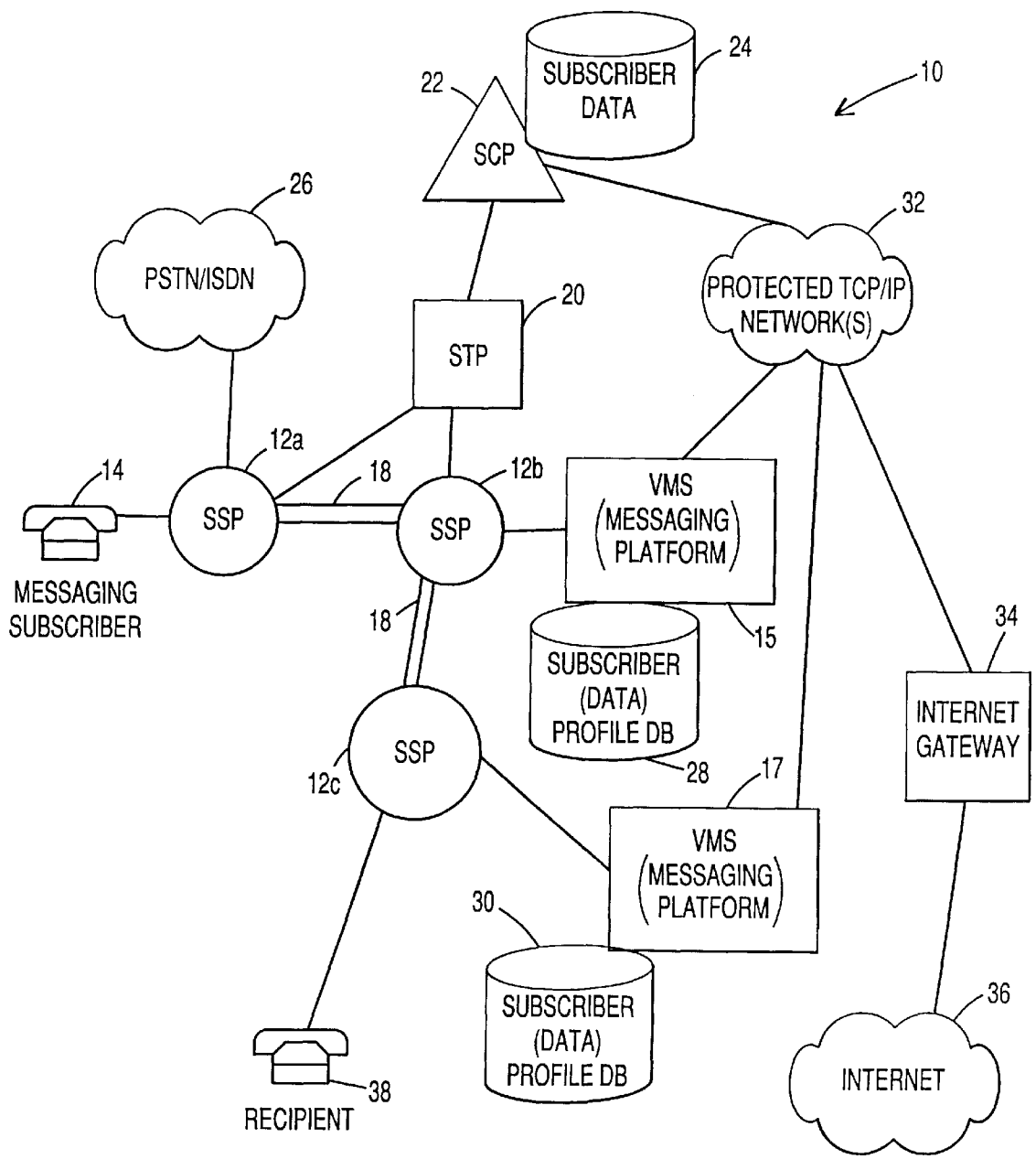
FIG. 1 is an exemplary environment wherein exemplary embodiments of the present invention may operate.

The present invention solves the need for a messaging system that protects the anonymity of a sending party, should such anonymity be desired, by providing methods and systems that allow a message in a messaging system to be designated such that it may be made available without revealing an identity of the sending party associated with the message.

Generally stated, the present invention includes an exemplary method that allows a determination to be made that the sending party associated with the message desires the message to be delivered without revealing the identity of the sending party. In response to the determination, an anonymity indicator is included in the message. The message is routed to the voice mail system serving the recipient, and it is noted that the message includes an anonymity indicator. In response to the inclusion of the anonymity indicator, the identity of the sending party (such as the sending party name, calling party number, sending party number, and/or e-mail address) is withheld so that the message is made available to the recipient without making the identity of the sending party available.

Exemplary Environment for Exemplary Embodiments

The exemplary embodiments of the present invention are used, preferably, with a region-wide messaging (RWM) system, as described in greater detail below. Nevertheless, the exemplary embodiments may be used with any type of telecommunications messaging system with the appropriate functionality.

The region-wide messaging system described herein allows a subscriber to the messaging system within the region of the service provider to send, receive, forward, and reply to messages, including voice mail messages, faxes, Internet data (including voice-over-Internet messages), and other electronic data. Subscribers may receive messages from other subscribers and non-subscribers. Subscriber-to-subscriber messaging, however, illustrates the advanced features of the region-wide messaging system such as: (1) Each subscriber may send a message to another subscriber; (2) Each subscriber may reply to a message received from another subscriber; (3) Each subscriber may reply to a telephone message received from a non-subscriber by implementing a feature that dials the non-subscriber; and (4) Each subscriber may receive and reply to Internet voice messages or fax messages.

Exemplary Telecommunications Messaging Network—FIG. 1

FIG. 1 is a block diagram of an exemplary telecommunications messaging network 10. The network 10 includes a variety of interconnected network elements. A group of such elements includes the plurality of end offices which are indicated as service switching points (SSPs or switches) 12a, 12b, 12c. An SSP typically includes switch functionality, but also includes other functionality so as to communicate with other network elements, and in particular, with Advanced Intelligent Network (AIN) elements. SSP 12a and SSP 12c are each coupled to a subscriber line, which also may be referred to as a calling line. Each SSP 12a, 12b, 12c serves a designated group of calling lines, and thus, the SSP that serves a particular calling line may be referred to as its serving switch. The calling line is typically connected to a piece of terminating equipment including a telephone 14. Although a telephone 14 is illustrated as the terminating equipment, those skilled in the art will understand that such terminating equipment may include other telecommunication devices including, but not limited to, facsimile machines, computers, modems, etc. End offices may further be coupled through a tandem office (not illustrated), which may be used to connect and switch circuits between and among end offices.

Each active calling line in an AIN is assigned a ten digit calling line number. A calling line number is commonly referred to as a telephone number or a directory number.

SSP 12b is connected by trunks (Signaling System 7 (SS7)) to a voice mail system (VMS) (messaging platform) 15. SSP 12c is connected by SS7 trunks to a voice mail system (VMS) (messaging platform) 17.

SSPs 12a, 12b, 12c are interconnected by a plurality of trunk circuits 18. These are the voice path trunks that interconnect the SSPs to connect communications. Each of the SSPs is connected to another type of AIN element referred to as a local signal transfer point (STP) 20 via respective data links. Currently, these data links employ a signaling protocol referred to as Signaling System 7 (SS7). Much of the intelligence of the AIN resides in yet another type of element referred to as a service control point (SCP) 22 that is connected to STP 20 over an SS7 data link. Among the functions performed by the SCP 22 is the maintenance of network databases and subscriber databases as represented collectively by databases (subscriber data) 24.

In order to keep the processing of data and calls as simple as possible, a relatively small set of triggers is defined at the SSPs for each call. A trigger in the AIN is an event associated with a particular calling line that generates a packet to be sent to an SCP. The trigger causes the SCP to query its databases or service package applications (SPAs) for processing instructions with respect to the particular call. The results are sent back to the SSP in response from the SCP 22 through STP 20. The return packet includes instructions to the SSP as to how to process the call. The instructions may be to take some special action as a result of a customized calling service or an enhanced feature. In response to the instructions, the SSP moves through its call states, collects the called digits, and generates further packets that are used to set up and route the call. Similar devices for routing calls among various local exchange carriers are provided by regional STP (not illustrated) and by regional SCP (not illustrated) which may be connected to STP 20, SCP 22, and/or to the elements described herein through the public switched telephone network (PSTN) 26.

When a messaging subscriber (such as the person or entity using telephone 14) subscribes to a messaging service, an entry is created in a VMS such as VMS 15. Each VMS 15, 17 includes subscriber administration, message retrieval, send, reply, forward, and mailbox maintenance functions. Each VMS 15, 17 includes or is functionally connected respectively to a subscriber profile database 28, 30 (subscriber data). Each subscriber profile database stores subscriber-specific profile information (subscriber information) for retrieval by VMS functions.

The VMS 15, 17 communicate according to the AIN 0.2 Switch Intelligent Peripheral Interface Generic Requirements—1129-CORE Specification, AINGR: SWITCH—INTELLIGENT PERIPHERAL INTERFACE (IPI) (A MODULE OF AINGR, FR-15); Document Number: GR-1129; Issue Number: 03; Updates: REV01-October 1998; Issue Date: September 1997; Product Type: Industry Requirements and Standards (RS); Component of FR-15, which is incorporated herein by reference. This 1129 Spec describes the modification of a Remote Operations parameter for indicating the invocation of a supplementary service. The service is identified by an operation value. The Remote Operations Parameter may be modified to allow the SCP and the VMS to share information regarding a subscriber to the messaging service.

In this messaging service, Internet messaging is allowed via a private Transmission Control Protocol/Internet Protocol (TCP/IP) network (protected TCP/IP network(s)) 32. The network 32 routes Light-weight Directory Access Protocol (LDAP) queries to the proper destination/recipient. The routing scheme may be based on a combination of the area code (NPA), other elements of a directory number, and/or the service provider. For example, a VMS may send an LDAP query to the SCP with a destination address of [404@]rwm.bellsouth.com. A domain name server (not illustrated) (DNS or domain server) associated with the TCP/IP network 32 routes the LDAP query to the correct SCP or other element for processing. In addition, the TCP/IP network 32 transports Voice Profile for Internet Mail (VPIM) encoded messages between VMS 15, 17 and other VMS within the network 10.

An Internet gateway 34 provides secure access between the private TCP/IP network 32 and the Internet 36. The gateway 34 limits the access of VPIM traffic to and from the Internet 36. In addition, the gateway 34 performs authorized LDAP messaging directory lookups to route messages received from the Internet 36.

To retrieve a message, for example, a subscriber (using telephone 14) places an administrative call to a "pilot" number that is served by SSP 12b. The call encounters a specific digits string (SDS) trigger provisioned on the SSP 12b. The SDS trigger causes the SSP 12b to launch a TCAP Info_Analyzed query to the SCP 22. The query includes the called number and the calling party number.

The SCP 22, in response to this information, accesses a table in its subscriber database 24 to determine the proper VMS to handle the call. The SCP 22 uses call information such as the calling and/or called party number to determine the address of this VMS, and instructs the SSP 12b to route the call to VMS 15.

The SSP 12b, in response to the instructions from the SCP 22, routes the call (including the calling party number) to VMS 15. The VMS 15 uses the calling party number to access the subscriber's mailbox in or through use of the subscriber profile database 28. The VMS 15 plays a greeting to the subscriber, and the subscriber may retrieve his/her messages, send, reply, forward a message, or undertake mailbox maintenance functions.

Exemplary Method—FIG. 2

FIG. 2 is a flow diagram illustrating an exemplary embodiment of a method to provide a recipient with a message without revealing an identity of a sending party. In other words, FIG. 2 illustrates an exemplary method for a sending party such as the messaging subscriber using telephone 14 to send an anonymous message. The sending party may be referred to as a subscriber. The identity of the sending party that is not revealed may include a name associated with the sending party, the calling line number associated with the calling line on which the sending party sent the message for the recipient, an e-mail address of the sending party, or the like. In particular, the identity of the sending party is withheld through the use of an anonymity feature.

Advantageously, a subscriber to a messaging service including an embodiment of the present invention may choose to enable the anonymity feature in at least one of two ways. The subscriber may desire that all of his/her messages be anonymous messages. If the subscriber desires that all of his/her messages be delivered without revealing an identity of the sending party, then the subscriber may have his/her message service provisioned such that all of his/her messages are so delivered. In that case, the anonymity feature may be said to be enabled for all of the subscriber's messages. In particular, the anonymity feature is enabled with respect to the mailbox associated with the subscriber. The information about the subscriber's desire to have the anonymity feature enabled for all of his/her messages may be stored with information relating to the subscriber (subscriber information) in the subscriber profile database associated with the appropriate VMS such as subscriber profile database 28 associated with VMS 15.

Alternatively, the subscriber may not wish to remain anonymous for all messages. The subscriber may choose to enable the anonymity feature only on a message by message basis. When a subscriber creates a message (for sending, replying or forwarding), the subscriber may be presented with an opportunity to enable the anonymity feature. For example, the subscriber may interact with the message service through a user interface of a voice mail system (VMS) and be presented with a list of options through a menu or other device. In particular, the subscriber may be asked: "Do you wish to make this an anonymous message? If so, press 1. If not, press 2." In response to the list of options, the subscriber may provide an indication that the message the subscriber created is to be delivered without revealing the identity of the sending party. For example, the sending party may "press 1" to provide an indication that the message is to be an anonymous message. The indication from the subscriber may be an audible response, a dual tone multi-frequency (DTMF) response, or the like.

Referring to FIG. 2, after start 100, per block 102 a sending party may create a message to send to a recipient, may create a message as a reply to a message that a recipient has left for the sending party, or may forward to a recipient a message that the sending party has received. Each of these actions is discussed now in more detail.

Sending an Anonymous Message

The sending party as a subscriber to a messaging service including an embodiment of the present invention may call an administration number or an access number (pilot number) of the messaging system, and in particular, of VMS 15 in the example. As explained above, the call is routed to the appropriate VMS 15. The subscriber then may step through options provided by the messaging service and choose to create a message. After the subscriber creates the message, the subscriber enters a destination number (DN or directory number) for the message.

Replying to a Message

The sending party as a subscriber to a messaging service including an embodiment of the present invention may create a message as a reply (reply message) to a message that has been left for the subscriber by another subscriber of the messaging service, and in some cases, by a non-subscriber. For example, once the subscriber has listened to the message, the message service advantageously may inquire whether the subscriber desires to reply to the message. The subscriber may indicate a desire to create a message in reply, and proceed to create the message. The destination number (DN or directory number) for this reply message is the calling line number associated with the calling line used by the subscriber (or non-subscriber) who left the message.

Forwarding a Message

The sending party as a subscriber to a messaging service including an embodiment of the present invention may review a message that has been left for the subscriber, and then the subscriber may forward the message (forwarding message) to one or more other subscribers to the messaging system. For example, once the subscriber has listened to the message, the message service advantageously may inquire whether the subscriber desires to forward the message. The destination number (DN or directory number) for this forwarding message may be entered by the subscriber. The function of "forwarding" a message may also be referred to as "copying" a message.

Whether the message is created for sending to a recipient, for replying to a message, or for forwarding to another recipient, the message may be an anonymous message. The message may be anonymous on the basis of the subscriber's designation of all of his/her messages as anonymous or on the basis of the message providing an indication that this message is to be anonymous.

Per block 104, a determination is made as to whether the anonymity feature has been enabled for all messages by being associated with the subscriber's mailbox. This determination may be made by the VMS by checking the subscriber information in the subscriber profile database 28. If the anonymity feature is not enabled for all messages, then in action 106 a determination is made as to whether the anonymity feature has been enabled for this message. This determination may be carried out by checking whether an indication has been received that the message the subscriber created is to be delivered without revealing the identity of the sending party. If the anonymity feature is not enabled for this message, then the exemplary method ends in block 108.

Referring again to block 104, if the anonymity feature is enabled for all messages, a check may be made per block 109 to determine whether the anonymity feature (generally enabled for all messages) is disabled for this message. This check may be carried out by determining whether an indication has been received that the message the subscriber created is to be delivered with the identity of the sending party. If the anonymity feature is disabled for this message, then the exemplary method ends in block 108.

On the other hand, if the determination in block 106 is positive or in block 109 is negative, i.e., that the anonymity feature is enabled (whether for all messages or for only this message), then in block 110 an anonymity indicator is included with the message.

The anonymity indicator may be included with the message in any manner of ways so as to indicate that the identity associated with the sending party of the message is to be withheld from the recipient. Several exemplary ways of including the anonymity indicator with the message are presented for purposes of illustration.

One way in which the anonymity indicator may be included with a message is to include the anonymity indicator in a header field associated with the message. Messages between voice mail systems in the message service of an exemplary embodiment are exchanged through the use of the Voice Platform for Internet Profile (VPIM) protocol. Generally, an RFC822 header field in the VPIM protocol defines the originator of the message. The anonymity indicator may be included in an RFC822 header field associated with the message. In particular, the RFC822 header fields may include International Telecommunications Union (ITV) Standard E.164 compliant telephone numbers. For example, a minus sign ("−") may be used as the first entry in the "From" field pertaining to the sending party and including the calling party number in the RFC822 header field associated with the message. Thus, the RFC822 header fields including a minus sign as an anonymity indicator may appear as follows:

To: +4045551212+1@bellsouth.com
From: −17705551212+3@bellsouth.com
X-Anonymous Message In the exemplary RFC822 header fields, the minus sign is an anonymity indicator that alerts the voice mail system serving the recipient that the identity associated with the sending party of the message is to be withheld from the recipient. Another symbol, term, or the like may be defined by the message service as an anonymity indicator and included with the message such as by inclusion in the RFC822 header field in the VPIM protocol.

Another way in which the anonymity indicator may be included with a message is to use multipurpose Internet mail extensions (MIME). MIME is a specification that enables Internet users to send multipart and multimedia messages. Electronic mail (e-mail) applications that have MIME may send PostScript images, binary files, audio messages, and digital video over the Internet. For example, a MIME compliant body part may be included with the message to convey the anonymity indicator and to indicate the message is an anonymous message.

Still referring to FIG. 2, per block 112 the message including the anonymity indicator (in whatever manner it has been included) is routed to the voice mail system (VMS) serving the recipient of the message created by the sending party. For example, the subscriber using telephone 14 may have created a message for a recipient using telephone 38 whose calling line is served by SSP 12c. The message from subscriber using telephone 14 may be routed so that it arrives at the VMS 17 serving the recipient using telephone 38. The anonymous message is routed just as a message is routed, but for the inclusion of the anonymity indicator. The VMS serving the sending party does not remove the identity or any other information from the message because it is an anonymous message. The VMS serving the recipient receives the identity of the sending party even though the message is an anonymous message. The receipt of this identity allows the VMS serving the recipient to properly route a reply message from the recipient as is explained below.

In block 114, the VMS serving the recipient notes the inclusion of the anonymity indicator with the message. The VMS serving the recipient of the message may be set up to look for the anonymity indicator in the RFC header fields of the VPIM protocol, in a MIME compliant body part included with the message, or in other places as configured by the message service.

Ordinarily, when retrieving a message from the message service, the recipient may obtain envelope information which may identify the time, date, and length of the message, and which may reveal an identity of the sending party such as a name associated with the sending party, the calling line number associated with the calling line on which the sending party sent the message for the recipient, an e-mail address of the sending party, or the like.

But in block 116, in response to the notation of the inclusion of the anonymity indicator with the message, the identity of the sending party associated with the message is withheld. For example, the name associated with the sending party, the calling line number associated with the calling line on which the sending party sent the message, or the e-mail address of the sending party may be withheld from the recipient of the message. Otherwise, the message is made available for retrieval by the recipient. For example, the recipient using telephone 38 may retrieve the message from the sending party, but the message will not include the identity of the sending party. If the recipient obtains envelope information for the message, the envelope information will not include the identity of the sending party. Per block 108, the exemplary method ends.

Replying to an Anonymous Message

Advantageously, exemplary embodiments of the present invention provide that a recipient may reply to an anonymous message. The option of replying is anti-intuitive because the recipient is not provided with the identity of the sending party. Nonetheless, the recipient may create a reply message and have it routed to the VMS serving the sending party so as to be available for retrieval by the "anonymous" sending party. The option of replying is made possible by the fact that the VMS serving the recipient is in possession of the appropriate routing information for the reply message. The VMS serving the recipient receives an anonymous message just as if it were not an anonymous message, but for the anonymity indicator. The VMS serving the recipient withholds the identity of the sending party from the recipient, but does not delete or otherwise destroy the identity. Thus, the VMS serving the recipient may use the identity to route a reply message to the VMS serving the sending party.

Blocking an Anonymous Message

Another advantage of exemplary embodiments of the present invention is that a recipient may reject or block an anonymous message. For example, a recipient may be a subscriber of the message service who has his/her message service set up so that all messages that are anonymous are rejected or blocked. Thus, if the VMS serving the recipient notes the inclusion of an anonymity indicator in a message, then instead of withholding the identity but otherwise making the message available to the recipient, the VMS may reject or block the anonymous message. For example, in response to the receipt of an anonymous message, the VMS may return an error message or some other message indicating the rejection to the VMS serving the sending party.

Given the foregoing disclosure of the exemplary embodiments for the present invention, other embodiments will suggest themselves to those skilled in the art. Therefore, the scope of the present invention is to be limited only by the claims below.

We claim:

1. In a messaging system including a mail system that serves a plurality of subscribers including a recipient, that receives messages from sending parties to recipients, the messages including respective identities relating to the sending parties, and that makes the messages and the respective identities of the sending parties available for retrieval by the recipients, a method to provide a recipient with a message without revealing an identity of a sending party associated with the message, comprising:

A. receiving the message for the recipient, the message including the identity of the sending party and including an anonymity indicator; and B. in response to receipt of the message including the anonymity indicator, withholding the identity of the sending party when making the message available for retrieval by the recipient.

2. The method of claim 1, wherein the anonymity indicator comprises a flag associated with an E.164 compliant number corresponding to the message.

3. The method of claim 1, wherein the anonymity indicator comprises an indicator in a RFC822 header field corresponding to the message.

4. The method of claim 1, wherein the anonymity indicator comprises an indicator in an attachment to the message, the attachment being compliant with multi-part mail encoding (MIME) protocol.

5. The method of claim 1, wherein the identity comprises a name associated with the sending party, a calling line number associated with a calling line of the sending party, or an electronic mail (e-mail) address of the sending party.

6. The method of claim 1, wherein the message comprises a reply to a previous message received by the sending party, or a forwarding message of an earlier message received by the sending party.

7. The method of claim 1, further comprising:

C. providing the recipient with an option to send a reply to the sending party even though the identity of the sending party was withheld when the message was made available for retrieval by the recipient.

8. The method of claim 1, further comprising:

D. receiving a reply to the message from the recipient for the sending party; and E. routing the reply to the sending party by using the identity of the sending party even though the identity of the sending party was withheld when the message was made available for retrieval by the recipient.

9. In a messaging system including a mail system that serves a plurality of subscribers including a recipient, that receives messages from sending parties to recipients, the messages including respective identities relating to the sending pates, and that makes the messages and the respective identities of the sending pates available for retrieval by the recipients, a method to provide a recipient with a message without revealing an identity of a sending party associated with the message, comprising:

A. receiving the message for the recipient, the message including the identity of the sending party and including an anonymity indicator; and B. in response to receipt of the message including the anonymity indicator, rejecting the message based on the anonymity indicator.

10. In a messaging system including a mail system that serves a plurality of sending parties by routing messages to recipients, the messages including respective identities of the sending parties, a method to mark a message to a recipient so the message as made available to the recipient fails to reveal an identity of the sending party, the method comprising:

A. receiving the message to be made available to the recipient, the message including the identity of the sending party;

B. determining that a desire of the sending party associated with the message is for the message to be delivered to the recipient without revealing the identity of the sending party; and C. in response to determining the desire of the sending party for the message to be delivered without revealing the identity of the sending party, associating an anonymity indicator with the message including the identity of the sending party.

11. The method of claim 10, wherein action B comprises determining that the desire of the sending party associated with the message is for the message to be delivered to the recipient without revealing the identity of the sending party by checking subscription information associated with the sending party.

12. The method of claim 10, wherein action B comprises determining that the desire of the sending party associated with the message is for the message to be delivered to the recipient without revealing the identity of the sending party by receiving an indication from the sending party that the message is to be delivered without revealing the identity of the sending party.

13. The method of claim 10, wherein the identity comprises a name associated with the sending party, a calling line number associated with a calling line of the sending party, or an electronic mail (e-mail) address of the sending party.

14. The method of claim 10, wherein the message comprises a reply to a previous message received by the sending party, or a forwarding message of an earlier message received by the sending party.

15. The method of claim 10, further comprising:

D. routing the message including the identity of the sending party and the anonymity indicator to the recipient, the anonymity indicator serving to alert that the message is to be delivered without revealing the identity of the sending party, and the identity of the sending party serving to provide the recipient with an option to send a reply to the sending party even though the identity of the sending party was withheld when the message was delivered.

16. The method of claim 15, further comprising:

E. receiving a reply to the message from the recipient for the sending party; and F. routing the reply to the sending party by using the identity of the sending party even though the identity of the sending party was withheld when the message was delivered.

17. In a communications system including at least two functionally connected voice mail systems, wherein a first voice mail system serves a plurality of subscribers including a sending party, and wherein a second voice mail system serves another plurality of subscribers including a recipient, the second voice mail system providing the recipient with a calling line identification service, a method to send the recipient a message from the sending party without the message revealing an identity of the sending party when the message is retrieved, the method comprising:

receiving the message at the first voice mail system;

in response to receiving the message, causing the first voice mail system to check whether an anonymity feature is enabled for all messages received from the sending party, or whether the anonymity feature is enabled for the message;

in response to finding the anonymity feature enabled for all messages or for the message, causing the first voice mail system to include an anonymity indicator with the message and to route the message to the second voice mail system;

receiving the message including the anonymity indicator at the second voice mail system; and causing the second voice mail system in response to receipt of the message with the anonymity indicator to withhold the identity of the sending party when the message is retrieved from the second voice mail system.

18. The method of claim 17, wherein the identity comprises a name associated with the sending party, a calling line number associated with a calling line of the sending party, or an electronic mail (e-mail) address of the sending party.

19. The method of claim 17, wherein the message comprises a reply to a previous message received by the sending party, or a forwarding message of an earlier message received by the sending party.

20. The method of claim 17, further comprising:

causing the second voice mail system to provide the recipient with an option to send a reply to the sending party even though the identity of the sending party was withheld when the message was retrieved from the second voice mail system.

21. The method of claim 17, further comprising:

causing the second voice mail system to receive a reply to the message from the recipient for the sending party; and causing the second voice mail system to route the reply to the sending party by using the identity of the sending party even though the identity of the sending party was withheld when the message was retrieved from the second voice mail system.

22. The method of claim 17, wherein in response to the receipt of the message with the anonymity indicator, causing the second voice mail system to reject the message based on the anonymity indicator.

23. In a functionally interconnected communications system including the public switched telephone network (PSTN), an Advanced Intelligent Network (AIN), and the Internet, the communications system also including a network voice mail system serving a plurality of subscribers including a sending party, the network voice mail system being at least functionally connected to an other network voice mail system in the communications system, the other network voice mail system serving an other plurality of subscribers including a recipient, the other voice mail system providing at least the recipient with a calling line identification service, a system to send the recipient a message from the sending party without the message revealing an identity of the sending party when the message is retrieved, the system comprising:

the network voice mail system operative to receive the message over the PSTN, the AIN, or the Internet from the sending party and directed to the recipient, to check whether an anonymity feature is enabled for all messages received from the sending party, and if the anonymity feature is not enabled for all messages, to check whether the anonymity feature is enabled for the message, and in response to finding the anonymity feature enabled for all messages or for the message, to include an anonymity indicator with the message and to route the message to the other network mail system serving the recipient over the PSTN, the AIN, or the Internet; and the other network voice mail system operative to receive the message including the anonymity indicator over the PSTN, the AIN, or the Internet from the network voice mail system, and in response to the anonymity indicator, to withhold the identity of the sending party when the message is retrieved from the other network voice mail system.

24. The method of claim 23, wherein the identity comprises a name associated with the sending party, a calling line number associated with a calling line of the sending party, or an electronic mail (e-mail) address of the sending party.

25. The method of claim 23, wherein the message comprises a reply to a previous message received by the sending party or a forwarding message of a previous message received by the sending party.

26. The method of claim 23, wherein the other network mail system is further operative to provide the recipient with an option to send a reply to the sending party even though the identity of the sending party was withheld when the message was retrieved from the other network voice mail system.

27. The method of claim 23, wherein the other network mail system is farther operative to receive a reply to the message from the recipient for the sending party; and to route the reply to the sending party by using the identity of the sending party even though the identity of the sending party was withheld when the message was retrieved from the other network voice mail system.

28. The method of claim 23, wherein in response to the receipt of the message including the anonymity indicator, the other network voice mail system is operative to reject the message based on the anonymity indicator.

* * * * *